(12) United States Patent
Nishikawa et al.

(10) Patent No.: US 8,385,203 B2
(45) Date of Patent: Feb. 26, 2013

(54) RESENDING CONTROL CIRCUIT, SENDING DEVICE, RESENDING CONTROL METHOD AND RESENDING CONTROL PROGRAM

(75) Inventors: Kenzoh Nishikawa, Kanagawa (JP); Kazuyuki Sakoda, Tokyo (JP); Chihiro Fujita, Kanagawa (JP); Erika Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 12/974,046

(22) Filed: Dec. 21, 2010

(65) Prior Publication Data

US 2011/0126070 A1 May 26, 2011

Related U.S. Application Data

(62) Division of application No. 11/724,298, filed on Mar. 15, 2007, now Pat. No. 7,881,201.

(30) Foreign Application Priority Data

Mar. 24, 2006 (JP) ................................. 2006-083359

(51) Int. Cl.
*G01R 31/08* (2006.01)
(52) U.S. Cl. ...................................................... 370/235
(58) Field of Classification Search .................. 370/235, 370/379, 382, 394, 413–418; 714/18, 708, 714/748–750; 710/52–54
See application file for complete search history.

(56) References Cited

U.S. PATENT DOCUMENTS

| | | | |
|---|---|---|---|
| 5,000,149 A | 3/1991 | Miyama | |
| 7,457,641 B1 | 11/2008 | Legnain et al. | |
| 2004/0131074 A1 | 7/2004 | Kurth | |
| 2005/0094667 A1 | 5/2005 | Dahlman et al. | |

FOREIGN PATENT DOCUMENTS

| | | |
|---|---|---|
| JP | 08-065331 | 3/1996 |
| JP | 11-065961 | 3/1999 |
| JP | 3011159 | 12/1999 |
| JP | 2001-160842 | 6/2001 |
| JP | 2005-005968 | 1/2005 |
| JP | 2005-260375 | 9/2005 |

*Primary Examiner* — Kwang B Yao
*Assistant Examiner* — Tung Q Tran
(74) *Attorney, Agent, or Firm* — Finnegan, Henderson, Farabow, Garrett & Dunner, L.L.P.

(57) ABSTRACT

A resending control circuit for controlling resending of data to be sent to a sending destination, includes: a writing unit for writing resending information generated corresponding to each of data to be resent and including the resending point-in-time of the data in memory; a reading unit for reading out the resending information from the memory; and a control unit for comparing resending point-in-time included in the oldest resending information of resending information stored in the memory with current point-in-time, and executing resending processing of data corresponding to the resending information according to the comparison result.

11 Claims, 11 Drawing Sheets

RESENDING CONTROL CIRCUIT, SENDING
DEVICE, RESENDING CONTROL METHOD
AND RESENDING CONTROL PROGRAM

CROSS REFERENCES TO RELATED
APPLICATIONS

This is a divisional of application Ser. No. 11/724,298, filed Mar. 15, 2007 now U.S. Pat. No. 7,881,201, which is based on and claims the benefit of priority under 35 U.S.C. §119 from Japanese Patent Application No. JP 2006-083359 filed in the Japanese Patent Office on Mar. 24, 2006. The entire contents of the above-referenced applications are incorporated herein by reference.

BACKGROUND OF THE INVENTION

1. Field of the Invention

The present invention relates to a resending control circuit, a resending control method and a resending control program, whereby resending of data to be sent to a sending destination is controlled.

2. Description of the Related Art

Commonly, under a wireless communication environment, a sending error or the like occurs during sending of data to be sent (hereafter, referred to as "sending data"), and a situation wherein none of the data to be sent reaches the reception side frequently occurs. Therefore, with a communication device for performing wireless communication, for example, a resending function such as the communication device disclosed in Japanese Patent. No. 3011159 (hereafter, a circuit for realizing this function is referred to as "resending control circuit") is provided, and accessibility of sending data is secured. As for a communication device including this kind of resending function, for example, there is a communication device disclosed in Japanese Patent No. 3011159. With the communication device disclosed in Japanese Patent No. 3011159, resending point-in-time, resending destination, and so forth corresponding to sending data that has already sent are stored in memory, a register, or the like as resending information, and are managed, and resending processing is executed based on this resending information.

Now, description will be made regarding resending processing that is executed by an existing resending control circuit with reference to FIG. 10. First, a resending control circuit 200 illustrated in FIG. 10 includes multiple registers 201 storing resending information (e.g., made up of resending point-in-time, a resending destination, and so forth corresponding to sending data that has already sent) for each resending destination (node), and multiple comparing units 202 for performing comparing processing for each of the multiple registers 201. The resending control circuit 200 reads out all of the resending information stored for each of the registers 201 with a predetermined time interval, compares the readout resending information with the current point-in-time at the comparing units 202, and determines regarding whether or not the current point-in-time has passed resending point-in-time. Subsequently, in the event of determining that the current point-in-time has passed the resending point-in-time, the resending control circuit 200 outputs a resending processing trigger to predetermined sending processing means. Subsequently, upon a resending processing trigger being input, the sending processing means start resending processing.

Next, a resending control circuit 300 illustrated in FIG. 11 includes memory 301 storing resending information for each region allocated for each address Addr, a reading unit 302 reading out resending point-in-time TxTime from the resending information stored in each storage region, and a comparing unit 303 performing comparison processing for comparing the resending point-in-time TxTime read out by the reading unit 302 with the current point-in-time. With the resending control circuit 300, the reading unit 302 reads out all of the resending information stored in the memory 301 for each predetermined time interval, and the comparing unit 303 compares the readout resending information with the current point-in-time, determines regarding whether or not the current point-in-time has passed the resending information, and outputs a resending processing trigger.

Also, in response to an ACK signal from a sending destination received by receiving means included in the communication device, the resending control circuits 200 and 300 perform for deleting the resending information that is unnecessary for resending from the registers 201 and memory 301.

SUMMARY OF THE INVENTION

However, with the comparison processing illustrated in FIG. 10, it is necessary to provide the number of comparing circuits equivalent to the number of registers, so as resending information to be managed increases, the processing amount and circuit scale of the comparing circuits increase. Also, with the comparison processing illustrated in FIG. 11, the reading unit reads out all of the resending information stored in the memory within a predetermined time interval, the comparing circuit compares the resending information with the current point-in-time, so as the resending information to be managed increases, the processing amount performed within a predetermined time interval increases, and accordingly, it is necessary to increase processing speed. Therefore, with an existing resending control circuit, as the number of resending information to be managed increases, power to be consumed increases.

There has been found the need for a resending control circuit, a sending device, a resending control method, and a resending control program, which perform management of resending information with low power consumption.

A resending control circuit according to an embodiment of the present invention is a resending control circuit for controlling resending of data to be sent to a sending destination, including: a writing unit for writing resending information generated corresponding to each of data to be resent and including the resending point-in-time of the data in memory; a reading unit for reading out the resending information from the memory; and a control unit for comparing resending point-in-time included in the oldest resending information of resending information stored in the memory with current point-in-time, and executing resending processing of data corresponding to the resending information according to the comparison result.

Also, a sending device according to an embodiment of the present invention is a sending device including a resending control circuit for controlling resending of data to be sent to a sending destination; wherein the resending control circuit includes: a writing unit for writing resending information generated corresponding to each of data to be resent and including the resending point-in-time of the data in memory; a reading unit for reading out the resending information from the memory; and a control unit for comparing resending point-in-time included in the oldest resending information of resending information stored in the memory with current point-in-time, and executing resending processing of data corresponding to the resending information according to the comparison result.

Also, a resending control method according to an embodiment of the present invention is a resending control method of a control circuit for controlling resending of data to be sent to a sending destination, including the steps of: writing resending information generated corresponding to each of data to be resent including the resending point-in-time of the data in memory; comparing resending point-in-time included in the oldest resending information of resending information stored in the memory with current point-in-time; and executing resending processing of data corresponding to the resending information according to the comparison result.

Also, a resending control program according to an embodiment of the present invention is a resending control program executed by a resending control circuit for controlling resending of data to be sent to a sending destination, including the steps of: writing resending information generated corresponding to each of data to be resent including the resending point-in-time of the data in memory; comparing resending point-in-time included in the oldest resending information of resending information stored in the memory with current point-in-time; and executing resending processing of data corresponding to the resending information according to the comparison result.

Of the resending information stored in memory, the resending point-in-time included in the oldest resending information is compared with the current point-in-time, the resending processing of data corresponding to the resending information is executed according to the comparison result, so even if the number of the resending information to be managed varies, the resending information to be compared with the current point-in-time for each predetermine time does not vary.

Accordingly, even if the number of the resending information to be managed increases, the processing amount of comparison processing for comparing the resending point-in-time with the current point-in-time for each predetermined time does not increase, whereby power consumption of a control circuit for performing resending control can be prevented from increasing.

DESCRIPTION OF THE PREFERRED EMBODIMENTS

Description will be made below in detail regarding specific embodiments to which the present invention is applied, with reference to the drawings.

Figure 1:
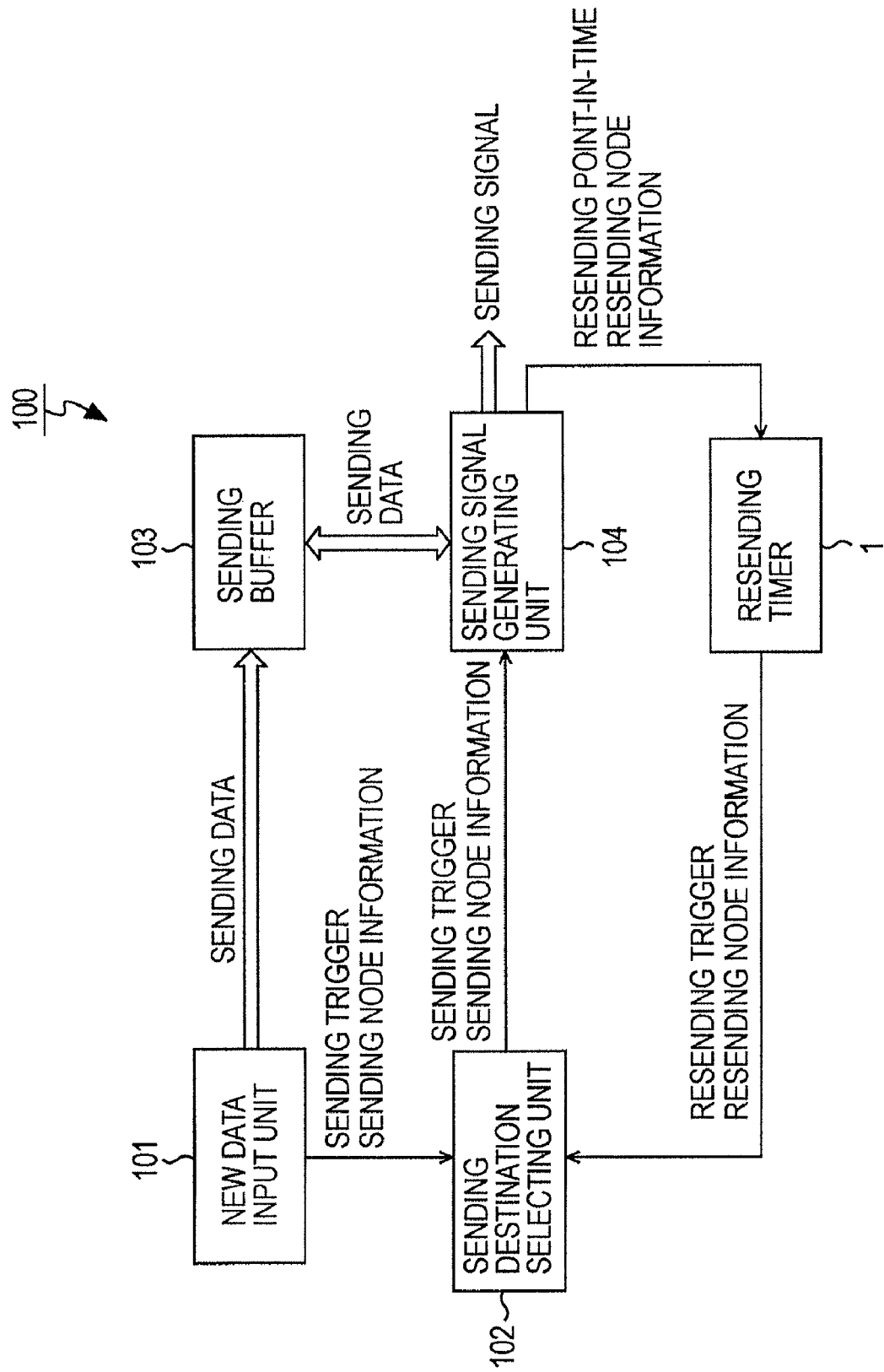
FIG. 1 is a block diagram illustrating the configuration of a sending control circuit.

First, description will be made regarding the configuration and operations of a sending control circuit 100 included in a communication device with reference to FIG. 1. The sending control circuit 100 is a control circuit for transmitting a sending signal to multiple sending destinations, and is made up of a new data input unit 101, a sending destination selecting unit 102, a sending buffer 103, a sending signal generating unit 104, and a resending timer 1.

The new data input unit 101 reads out sending Node information made up of a sending destination (sending node) and the number of packets and packet size of the data thereof from the data input to the sending control circuit 100, supplies this to the sending destination selecting unit 102, and also supplies sending data to the sending buffer 103. Also, the new data input unit 101 supplies the sending Node information and also a sending trigger to the sending destination selecting unit 102.

Upon a sending trigger being supplied from the new data input unit 101, the sending destination selecting unit 102 selects a sending destination based on the sending Node information supplied from the new data input unit 101, and supplies the sending Node information of the selected sending destination and the sending trigger to the sending signal generating unit 104.

The sending buffer 103 stores the sending data supplied from the new data input unit 101. Also, the sending buffer 103 supplies the sending data to the sending signal generating unit 104.

Upon the sending trigger being supplied from the sending destination selecting unit 102, the sending signal generating unit 104 reads out the sending data from the sending buffer 103. Subsequently, the sending signal generating unit 104 generates a sending signal based on a predetermined communication standard from the sending data read out from the sending buffer 103, and sends this to the sending destination corresponding to the sending Node information. Further, the sending signal generating unit 104 generates resending Node information based on the sending point-in-time and sending trigger to supply this to the resending timer 1. Here, the resending Node information is information employed for performing resending processing for resending the sending signal, and is made up of resending point-in-time and a resending destination.

Note that timing for generating the resending Node information is arbitrary, but with the present embodiment, description will be made below assuming that writing is performed at the timing wherein the sending processing by the sending signal generating unit 104 has been completed. However, "timing wherein the sending processing has been completed" means timing wherein the sending data is normally received at the sending destination, and an ACK frame is replied from the sending destination, and consequently, means that timing wherein sending from the sending source to the sending destination has been completed. Also, the resending Node information is generated not only at the time of first sending but also at the time of resending the same packet after this, and is supplied to the resending timer 1.

The resending timer 1, upon the resending point-in-time of the resending Node information supplied from the sending signal generating unit 104 passing the current point-in-time, supplies the resending trigger and the resending Node information to the sending destination selecting unit 102. Description will be made below in detail (first through third embodiments) focusing attention on the configuration and operations of the resending timer 1 serving as a resending management circuit according to the present embodiment.

First Embodiment

Figure 2:
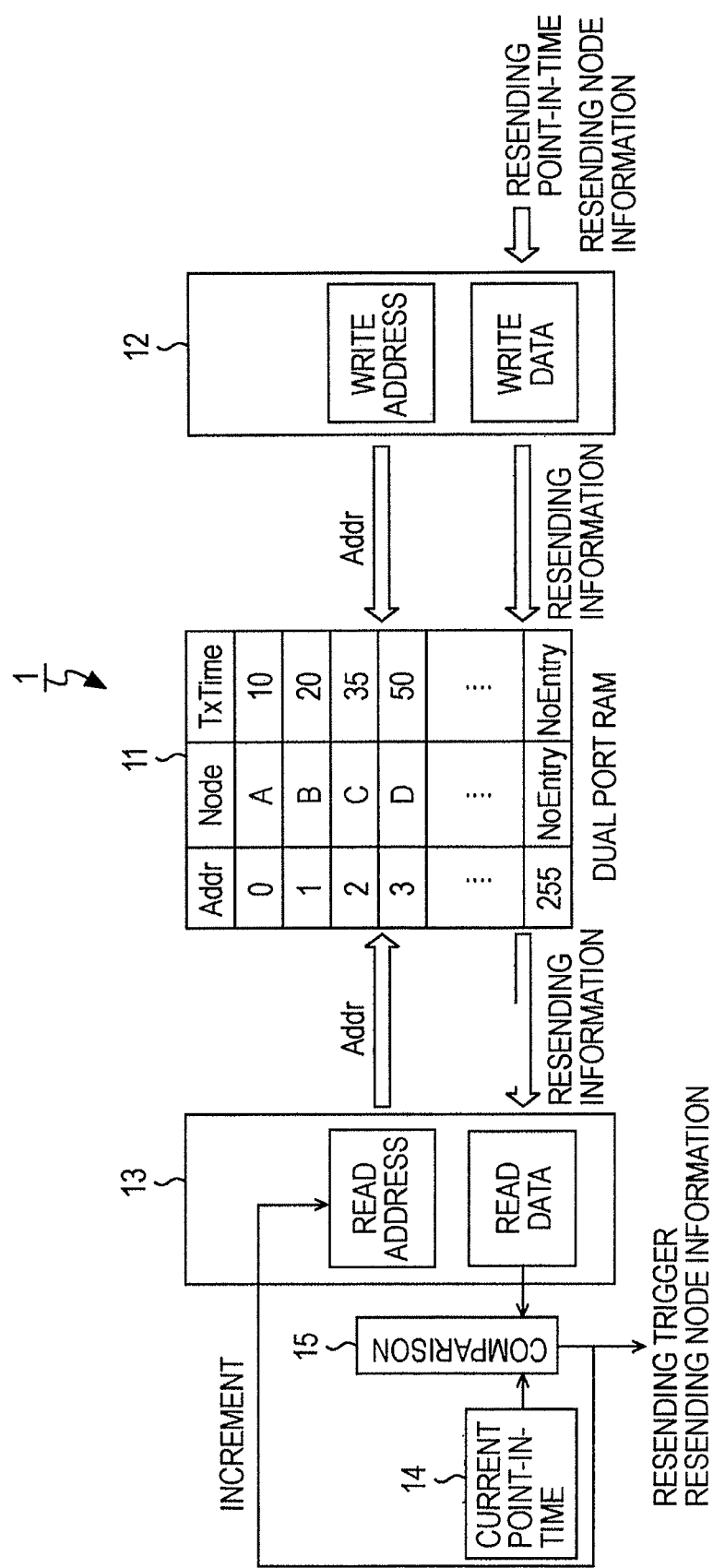
FIG. 2 is a configuration diagram illustrating the configuration of a resending timer unit.

The resending timer 1, as illustrated in FIG. 2, is made up of a ring buffer 11, a writing unit 12, a reading unit 13, a current point-in-time measuring unit 14, and a comparing unit 15.

The ring buffer 11 includes multiple storage regions allocated for each address Addr, and is a storing medium capable of writing and reading simultaneously. Specifically, the ring buffer 11, for example, is realized by a storing medium including two access ports such as dual port RAM or the like. The ring buffer 11 is employed for controlling resending to a sending destination wherein sending processing has been completed by storing the resending Node information made up of a sending node and resending point-in-time TxTime for each of these storage regions. Note that regarding how addresses Addr are allocated to the respective storage regions on the ring buffer 11 is arbitrary, but with the present embodiment, description will be made below assuming that the addresses Addr from 0'th through 255'th are allocated to the respective storage regions, and also one piece of the resending Node information is stored in the storage regions corresponding to the respective addresses Addr.

The writing unit 12 writes the resending Node information supplied from the sending signal generating unit 104 in the storage region corresponding to the address Addr specified by a writing pointer. Subsequently, following writing processing of the resending Node information being completed, the writing unit 12 is arranged so as to increment the address Addr specified by the writing pointer (in other words, one address to be written of the resending Node information varies). Consequently, in the event that the address specified by the writing pointer varies, and subsequently sending processing is completed, the resending Node information corresponding to the relevant packet is written in the storage region corresponding to the next address Addr on the ring buffer 11.

The reading unit 13 reads out, of the resending Node information stored in the ring buffer 11, the resending Node information having the oldest written point-in-time. That is to say, the reading unit 13 reads out the resending destination Node and resending point-in-time TxTime from the storage region of the address Addr specified by a readout pointer (this address Addr is incremented at the reading timing of resending Node information as described later, and accordingly always specifies the storage region corresponding to the oldest resending Node information). Subsequently, the reading unit 13 supplies the readout resending destination Node and resending point-in-time TxTime to the comparing unit 15.

The current point-in-time measuring unit 14 measures the current point-in-time using a predetermined clock oscillator circuit, and supplies the current point-in-time information to the comparing unit 15.

The comparing unit 15 compares the resending point-in-time TxTime of the resending Node information supplied from the reading unit 13 with the current point-in-time measured by the current point-in-time measuring unit 14. Upon performing this comparison for each predetermined time interval (e.g., for each 9 μs), and determining that the current point-in-time has passed the resending point-in-time, the comparing unit 15 supplies the resending trigger and the resending Node information to the sending destination selecting unit 102, and also causes the reading unit 13 to increment the address number specified by the readout pointer by one.

Thus, based on the resending Node information and so forth supplied from the comparing unit 15, a sending destination to be resent is selected at the sending destination selecting unit 102, and the resending processing is performed as to the selected sending destination. Also, along with the variation of the address Addr specified by the readout pointer, the reading address is changed to the subsequent address thereof, and the resending Node information to be read out is changed to that in the storage region corresponding to the subsequent address Addr thereof.

On the other hand, following the resending processing, with the sending signal generating unit 104, the resending Node information corresponding to the sending destination to be resent is generated again, and is supplied to the writing unit 12, and is written in the ring buffer 11 by the writing unit 12. Consequently, the packets resent are managed as resending objects, but the number of times of resending may be restricted from the perspective of utilization efficiency of communication bands.

Now, there is a point to be kept in mind at the time of realizing the above function. This is regarding which timing the resending Node information stored in the ring buffer 11 is eliminated at.

In the event that an arrangement is made wherein resending Node information is generated at the timing of completing the sending processing as to the sending destination as described above, the resending Node information corresponding to all of the sending destinations whose sending being completed and the sending destinations whose resending being completed is stored in the ring buffer 11. Consequently, under this configuration, even the resending Node information corresponding to the packet actually normally received at the reception side continues to be stored in the ring buffer 11, and managed as a resending object. It is needless to say that even if such a situation is ignored, exceptionally no event which denies inventiveness occurs, but from the perspective of the valid usage of transmission bands and data management it is desirable to determine only the sending data whose sending has been failed as a resending object.

From such a perspective, the resending timer 1 according to the present embodiment is arranged so as to execute processing for eliminating resending Node information from the ring buffer 11 at the point of receiving the ACK signal sent from the reception side following resending Node information being stored (the elimination processing in this case is executed independently of the storing order as to the ring buffer 11, and consequently, the ring buffer 11 is in a state of storing the resending Node information in a scattered manner, for example). Also, in the event that a resending trigger is output from the comparing unit 15, and the resending processing of a packet is executed as well, the resending Node information is arranged so as to be eliminated from the ring buffer 11 (the elimination processing in this case is executed as to only the oldest resending Node information stored in the ring buffer 11).

Note that the contents of the specific elimination processing are arbitrary, for example, an arrangement may be made wherein the resending Node information is eliminated at the point of receiving the ACK signal, and the subsequent records of the information (i.e., the resending Node information stored in the ring buffer 11 temporally later than the resending Node information) are packed from the front. However, with the present embodiment, in order to clarify description, let us say that the value of the resending Node information corresponding to that ACK signal at the time of receiving an ACK signal is substituted with zero. In the event that the value of the resending Node information is zero when selecting a resending object, the processing corresponding to that resending Node information is not performed, the processing based on the subsequent resending Node information is continued, thereby effectively preventing the resending processing corresponding to the sending data unnecessary for resending from execution. Note that description will be made later regarding the specific processing contents at this time with reference to FIG. 3.

Next, description will be made in detail regarding processing for modifying the address Addr number specified by the writing pointer or readout pointer with reference to FIG. 3. First, description will be made regarding the modification processing of the writing pointer.

In step S1, the writing unit 12 determines regarding whether or not the address Addr number currently specified by the writing pointer is 255, and in the event of determining that the number thereof is not 255, the flow proceeds to step S2, and in the event of determining that the number thereof is 255, the flow proceeds to step S3.

In step S2, the writing unit 12 increments the address Addr number specified by the writing pointer, and ends the processing process.

In step S3, the writing pointer modifies the specified address Addr number to zero, and ends the processing process.

According to this processing process, the writing pointer specifies 255 serving as the most significant address number of the ring buffer 11, following which is modified to zero serving as the least significant address number.

Figure 3:
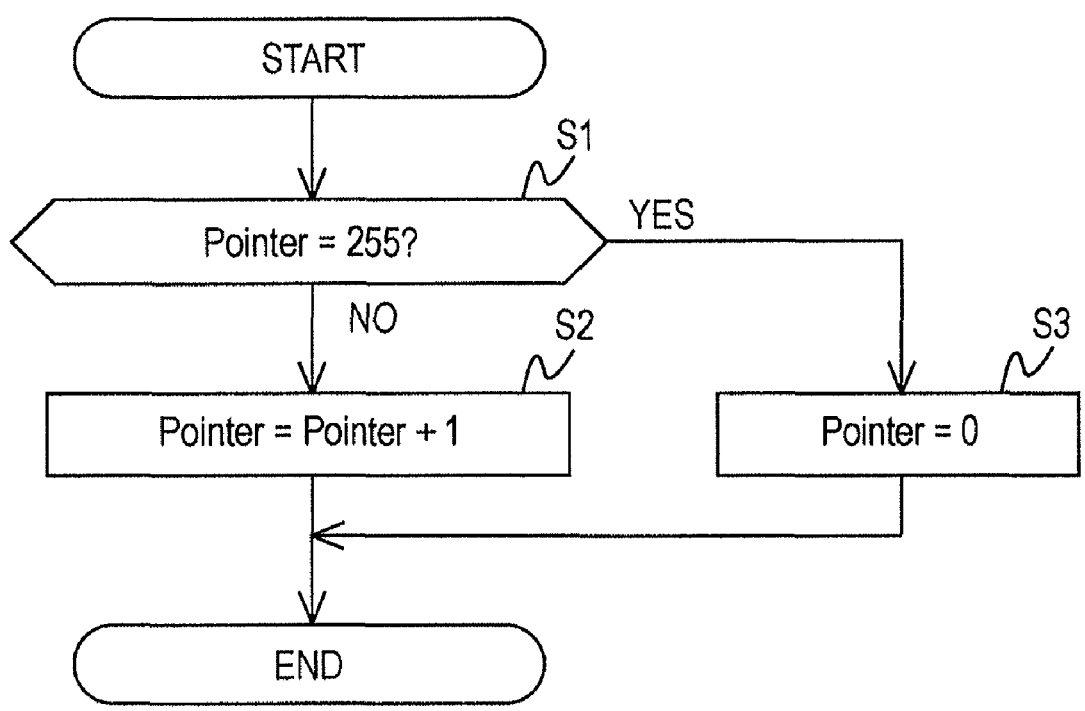
FIG. 3 is a flowchart illustrating the updating processing of a pointer by a writing unit.

Also, with the readout pointer as well, the specified address Addr number is modified in accordance with the processing process illustrated in FIG. 3 as with the writing pointer.

Accordingly, the ring buffer 11 is arranged so as to write and read resending Node information cyclically by modifying the address Addr numbers specified by the writing pointer and readout pointer mutually circulating in the same direction.

Next, description will be made in detail regarding the management processing process of resending Node information at the resending timer 1. With the initial stage, the writing pointer and readout pointer specify the same address number mutually. Also, as described above, with the writing pointer, the address Addr number specified therewith is modified following writing of resending Node information in the ring buffer 11 being completed, but with the readout pointer, the address Addr number specified therewith is modified at the same time of a resending trigger being supplied to the sending destination selecting unit 102. That is to say, timing for modifying the specified address Addr number differs between the writing pointer and readout pointer. Consequently, the address Addr specified by each of the pointers gradually varies following the present management processing being started.

Upon resending Node information being supplied from the sending signal generating unit 104 to the resending timer 1, the writing unit 12 writes the resending destination Node and resending point-in-time TxTime in the storage region corresponding to the address Addr specified by the writing pointer. Subsequently, the writing unit 12 modifies the address Addr number specified by the writing pointer in accordance with the above modification processing.

On the other hand, the reading unit 13 reads out the resending destination Node and resending point-in-time TxTime from the storage region of the address specified by the readout pointer for each predetermined time interval to supply these to the comparing unit 15.

The comparing unit 15 compares the resending point-in-time TxTime supplied from the reading unit 13 with the current point-in-time measured by the current point-in-time measuring unit 14, and in the event of determining that the current point-in-time has passed this resending point-in-time TxTime, supplies resending Node information to the sending destination selecting unit 102, and also causes the reading unit 13 to modify the address Addr specified by the readout pointer in accordance with the above modification processing.

Figure 4A:
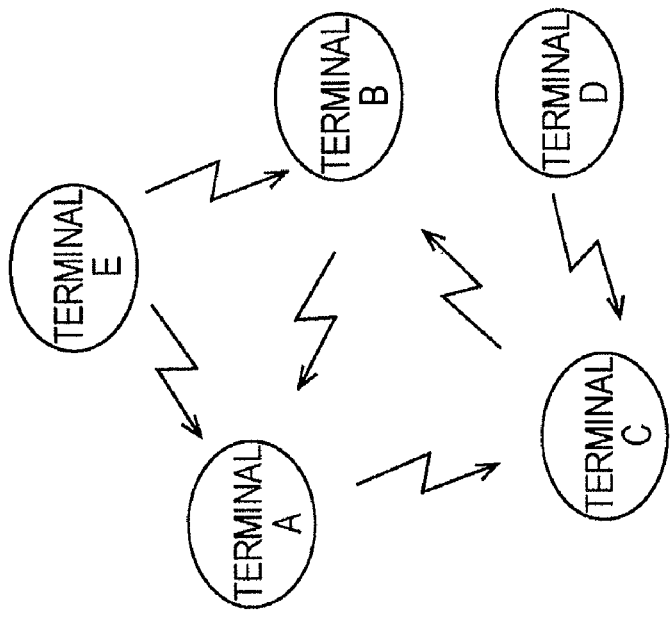
FIG. 4A is a schematic diagram illustrating terminals serving as sending destinations.
Figure 4B:
FIG. 4B is a diagram illustrating resending point-in-time corresponding to each of the terminals.
Figure 5:
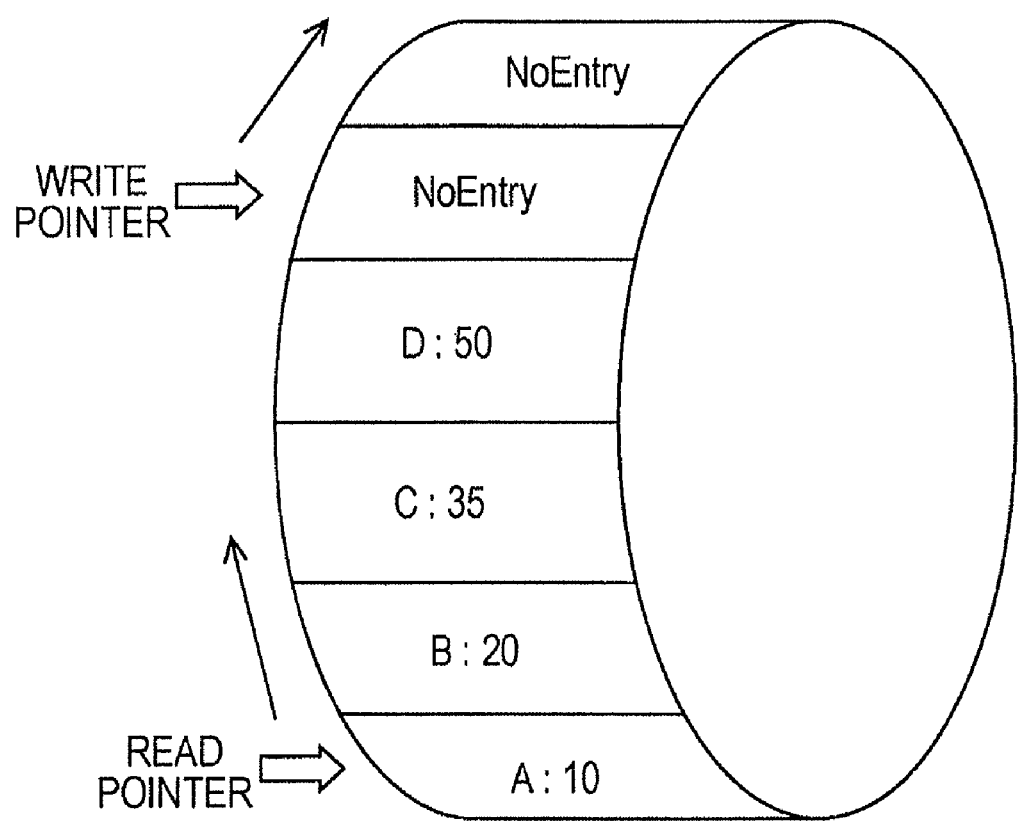
FIG. 5 is a schematic diagram illustrating writing and reading processing using a ring buffer.

Now, as a specific example, let us say that a sending signal is sequentially sent to the four sending destinations (terminals A, B, C, and D) illustrated in FIG. 4A by the sending signal generating unit 104, and the resending timer 1 manages the four pieces of resending Node information illustrated in FIG. 4B. In this case, with the resending timer 1, the ring buffer 11 is configured so as to be written and read out cyclically by the writing pointer and readout pointer, so for example, upon writing in the respective storage regions being performed in the sequence of (terminal A)→(terminal B)→(terminal C)→(terminal D) based on the resending point-in-time such as shown in FIG. 5, subsequently reading processing is performed in the same sequence.

Accordingly, with the comparing unit 15, the number of resending Node information to be compared with the current point-in-time for each predetermined time is always one, so even if the number of resending Node information to be managed increases, the comparison processing amount to be performed for each predetermined time interval does not increase in response thereto.

Particularly, in the event that the processing of the resending timer 1 is realized with a dedicated circuit, it is necessary to increase the storage capacity of the ring buffer 11 when the number of the resending Node information to be managed increases, but the circuit scale of the hardware equivalent to the comparing unit 15 does not increase, so power to be consumed within the circuit can be reduced as compared with the above existing resending management circuit.

Second Embodiment

Figure 6:
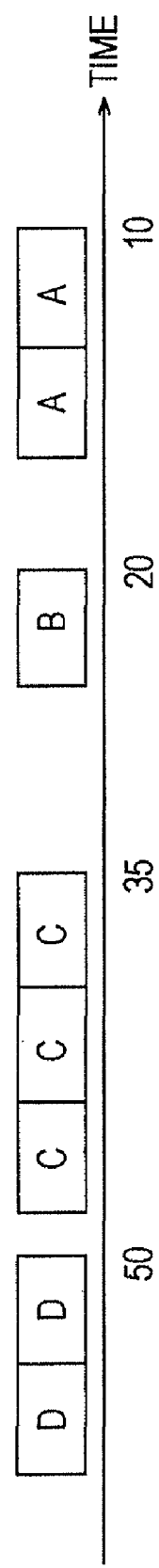
FIG. 6 is a diagram illustrating resending point-in-time in the case of coupling and sending packets for each terminal.
Figure 7:
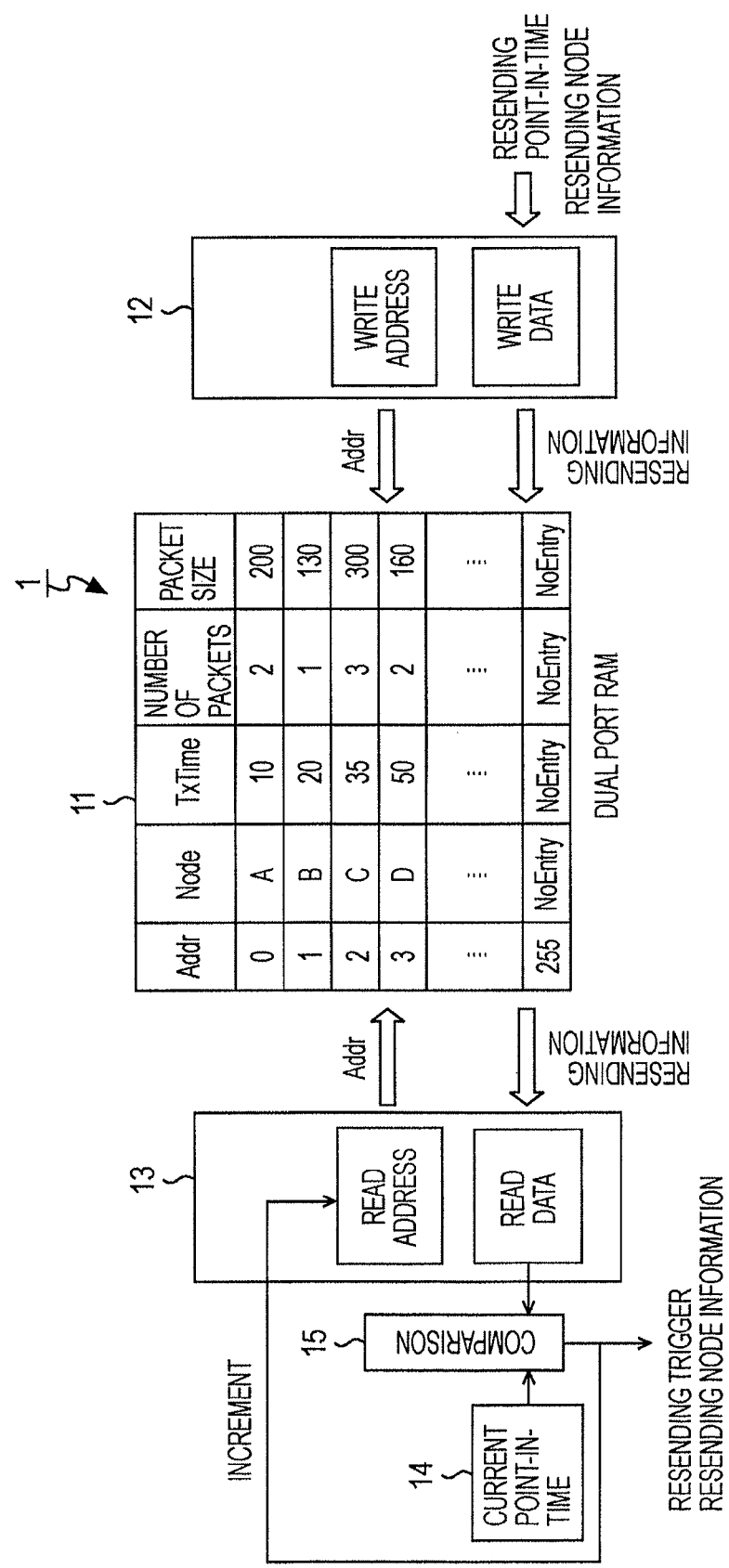
FIG. 7 is a configuration diagram illustrating the configuration of a resending timer unit.

As illustrated in FIG. 6, there is a sending method for creating a sending frame by coupling multiple packets to generate a sending signal. In the event that the sending control circuit 100 performs communication using such a sending method, the sending signal generating unit 14 generates resending Node information made up of the number of resending packets and resending packet size that are coupled in addition to the resending destination Node and resending point-in-time TxTime. Thus, with the ring buffer 11 of the resending timer 1, as illustrated in FIG. 7, the resending Node information for each resending destination is stored for each storage region of the address Addr, so the storage capacity can be reduced as compared with the case of storing the resending Node information in the address Addr for each packet.

Also, the sending destination selecting unit 102 can perform more complex sending selection using the number of resending packets and resending packet size to be added to the resending Node information. Specifically, with the sending destination selecting unit 102, in the event that the number of resending packets and resending packet size are great, the most appropriate sending selection is realized based on the resending Node information such as increasing the possibility that the sending destination thereof will be selected or the like, whereby improvement in sending efficiency can be realized.

Third Embodiment

Description will be made below regarding resending processing performed by the resending timer 1 in response to an ACK signal.

Figure 8:
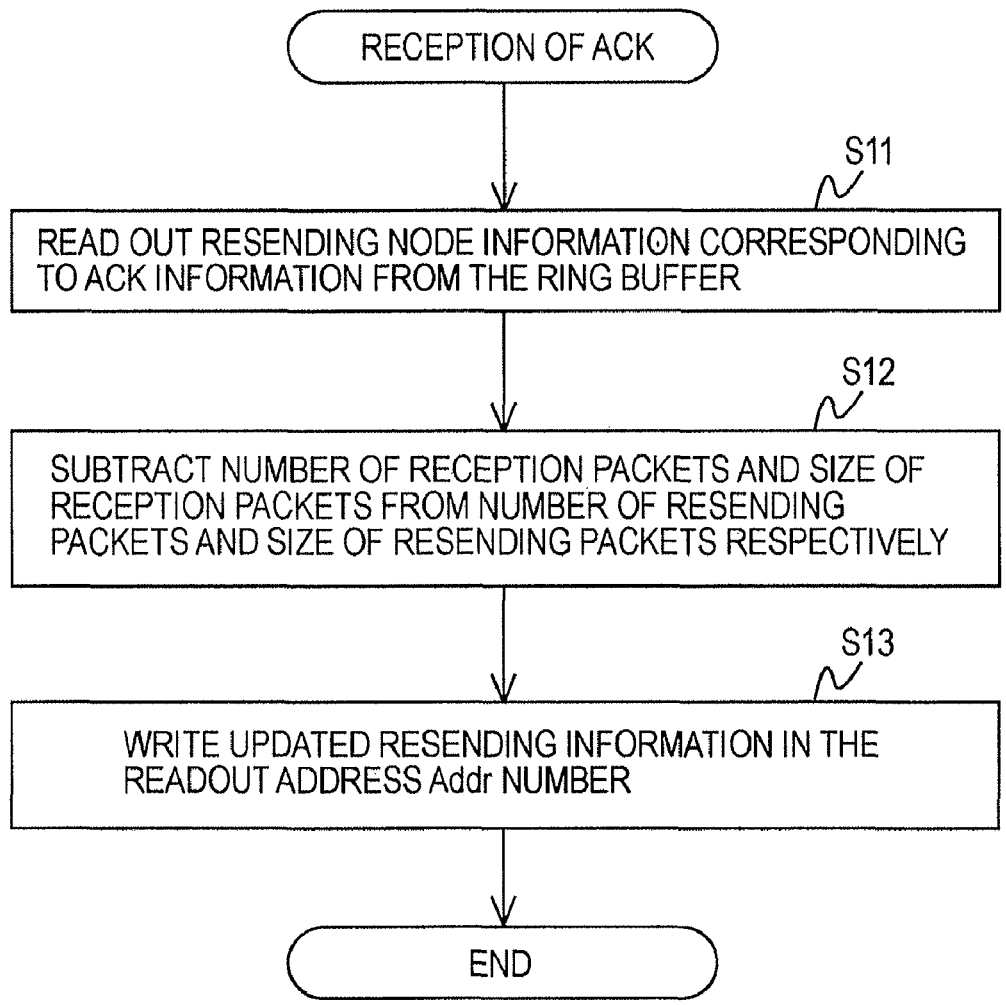
FIG. 8 is a flowchart illustrating a processing process for modifying resending Node information according to an ACK signal.

The resending timer 1, as described above, eliminates the resending Node information unnecessary for resending in response to an ACK signal from the ring buffer 11. On the other hand, the resending timer 1 according to the present embodiment causes the writing unit 12 to update the resending Node information in response to an ACK signal, thereby preventing resending processing as to the resending Node information unnecessary for resending from being performed. Accordingly, description will be made below in detail regarding the update processing of the resending Node information corresponding to an ACK signal with reference to FIG. 8.

With the initial stage, upon the communication device receiving an ACK signal, the information based on this ACK signal is supplied to the resending timer 1. Specifically, the information based on an ACK signal is made up of the number of received packets whose sending has been normally completed, and the received packet size thereof.

In step S11, the resending timer 1 searches the resending destination of the resending Node information corresponding to the supplied ACK information from the storage region of the ring buffer 11, and reads out the resending Node information stored in the storage region thereof. For example, upon an ACK signal being replied from the terminal C, the resending timer 1 specifies the address number 2 from the storage region of the ring buffer 11, and reads out the resending Node information from this storage region.

In step S12, the resending timer 1 subtracts the number of received packets and received packet size wherein reception has been normally completed from the ACK signal from the number of resending packets and resending packet size of the resending Node information respectively. For example, let us say that with the resending Node information of the terminal C serving as a resending destination, the number of resending packets is 3, and the resending packet size is 300. Subsequently, in the event that the number of received packets of ACK information is 1, and the received packet size is 100, according to the processing process, the number of resending packets of the resending Node information is modified to 2, and the resending packet sized is modified to 200.

In step S13, the resending timer 1 causes the writing unit 12 to write the new resending Node information modified at the storage region of the readout address Addr. For example, in the event that the readout address Addr number is 2, the writing unit 12 writes the new resending Node information in the storage region of the address Addr number 2, and ends the present processing.

Thus, the resending timer 1 modifies the number of packets and packet size thereof that are received in response to an ACK signal. Also, the writing unit 12 performs wiring processing of the resending Node information sequentially supplied from the sending signal generating unit 104 while incrementing the address Addr number specified by the writing pointer in accordance with the processing process illustrated in FIG. 3 regardless of the present update processing.

Figure 9:
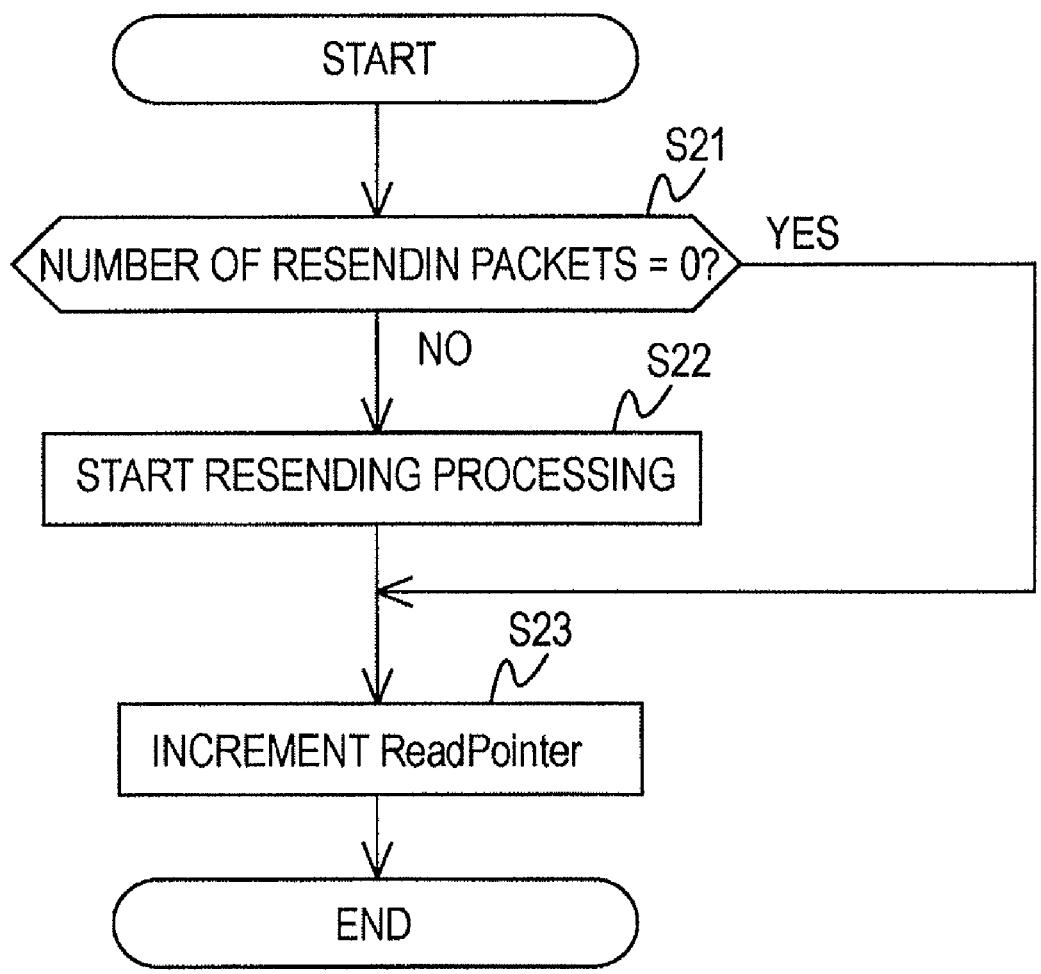
FIG. 9 is a flowchart illustrating the processing process of a reading unit for reading the resending Node information modified according to an ACK signal.
Figure 10:
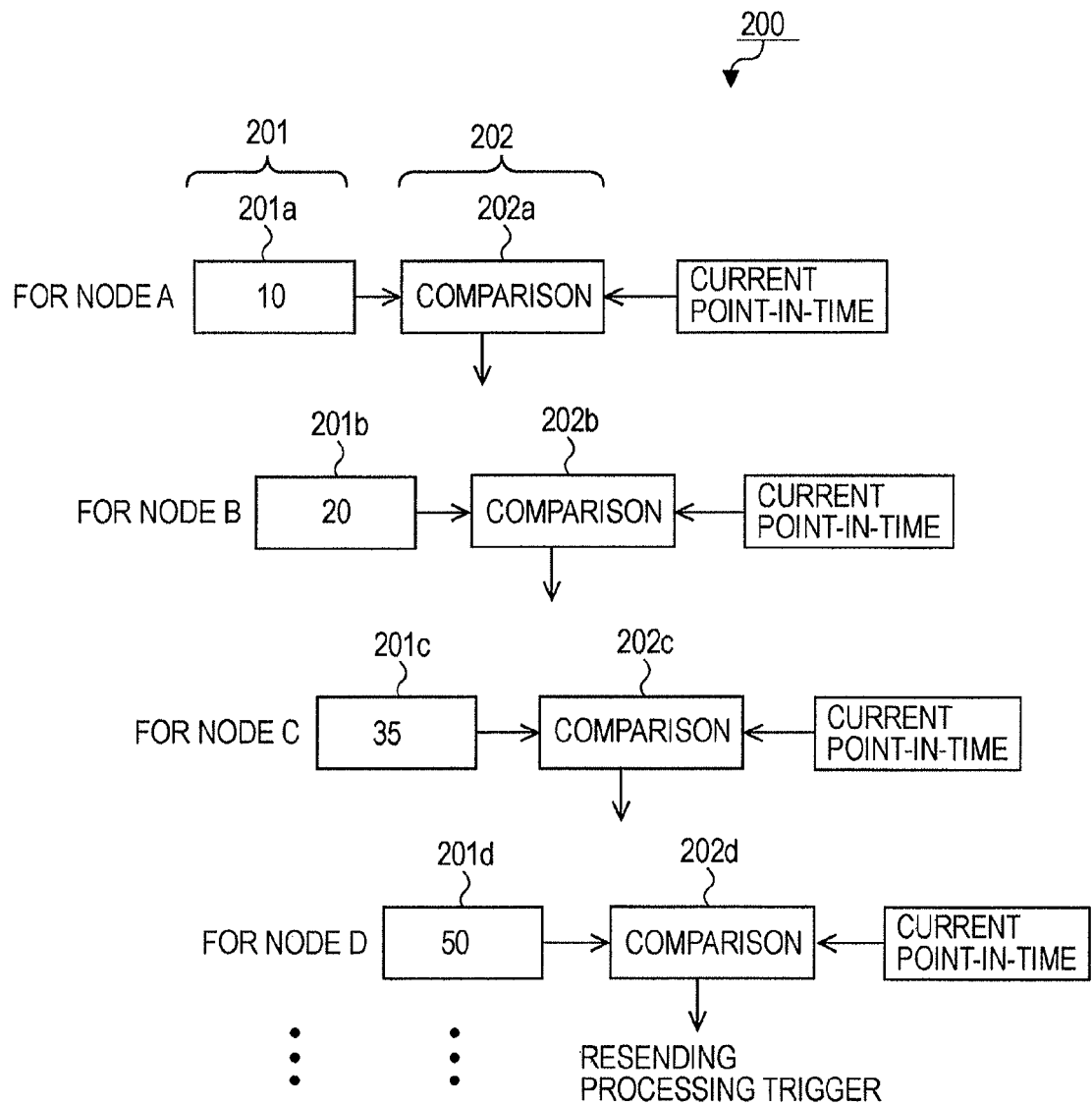
FIG. 10 is a diagram schematically illustrating an existing comparing circuit.
Figure 11:
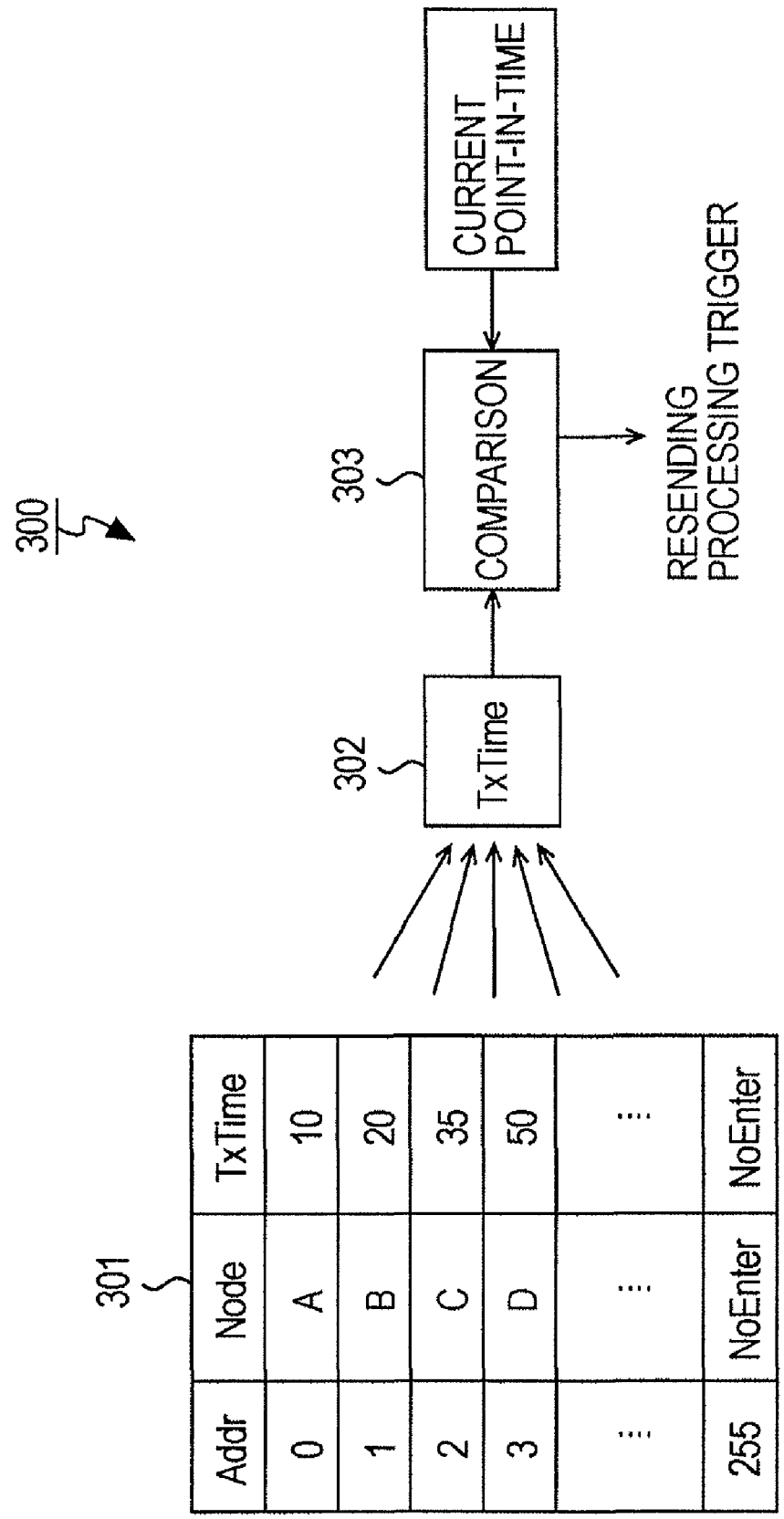
FIG. 11 is a diagram schematically illustrating an existing comparing circuit.

On the other hand, the reading unit 13, in addition to the above readout processing, further performs processing illustrated in FIG. 9.

In step S21, the reading unit 13 reads out resending Node information from the storage region of the address Addr specified by the readout pointer, and determines regarding whether or not the number of resending packets of this resending Node information is zero. Here, in the event of the reading unit 13 determining that the number of resending packets is zero, the flow proceeds to step S23, and in the event of determining that the number of resending packets is not zero, the flow proceeds to step S22.

In step S22, the reading unit 13 supplies the readout resending Node information to the comparing unit 15. Here, the comparing unit 15 performs the above comparison processing, and subsequently supplies a resending start request to the sending destination selecting unit 102.

In step S23, the reading unit 13 performs the modification processing of the readout pointer in accordance with the steps S1 trough S3 illustrated in FIG. 3.

As described above, the reading unit 13, in the event that the number of resending packets of the resending Node information modified in accordance with an ACK signal is zero, increments the address Addr number specified by the readout pointer without supplying this resending Node information to the comparing unit 15. That is to say, the resending timer 1 prevents the sending destination selecting unit 102 from starting of the unnecessary resending processing as to a resending destination whose number of resending packets is zero.

Incidentally, in the conventional sending control circuit included in a communication device, the resending Node information is eliminated at the point of receiving the ACK signal, and the subsequent records of the information are packed from the front. However, the amount of the processing increases when using the conventional method.

On the other hand, with the resending timer 1 for performing the readout processing illustrated in FIG. 9, there is no need to perform the elimination and movement processing of the resending Node information from the storage region, so the processing amount can be reduced. Particularly, in the event of realizing this resending timer 1 using hardware, the circuit scale and power consumption can be reduced in accordance with the reduction in the processing amount.

Note that the present invention is not restricted to the above embodiments, and it is needless to say that various types of modifications can be made without departing from the spirit and scope of this invention. It should be understood by those skilled in the art that various modifications, combinations, sub-combinations and alterations may occur depending on design requirements and other factors insofar as they are within the scope of the appended claims or the equivalents thereof.

What is claimed is:

1. A resending control circuit for controlling resending of data to be resent to a sending destination, the resending control circuit comprising:
   a writing unit configured to write resending information generated corresponding to each of data to be resent and including resending point-in-time of the data in a memory; and
   a reading unit configured to read out the resending information from the memory; and
   a control unit configured to compare resending point-in-time included in the oldest resending information stored in the memory with current point-in-time, and executing resending processing of data according to a comparison result, wherein the writing unit modifies a number indicating a quantity of resending packets included in the resending information in accordance with an ACK signal received by predetermined receiving means.

2. The resending control circuit of claim 1, wherein the memory is configured as a ring buffer.

3. The resending control circuit of claim 1, wherein the writing unit writes the resending information to a storage region of the memory according to a writing pointer indicating an address on the ring buffer.

4. The resending control circuit of claim 1, wherein the resending information further includes resending packet size of the resending information.

5. The resending control circuit of claim 1, wherein the reading unit reads out the resending information from a storage region of the memory according to a readout pointer indicating an address on the ring buffer.

6. The resending control circuit of claim 5, wherein the reading unit determines whether or not the number indicating the quantity of the resending packets included in the resending information read out from the storage region of the address specified by the readout pointer is zero,
in the event of determining that the number indicating the quantity of the resending packets is zero, the reading unit increments the address specified by the readout pointer without supplying the resending information to the control unit, and
in the event of determining that the number indicating the quantity of the resending packets is not zero, the reading unit supplies the resending information to the control unit, and increments the address specified by the readout pointer.

7. A resending control method of a control circuit for controlling resending of data to be resent to a sending destination, comprising the steps of:
writing resending information generated corresponding to each of data to be resent including resending point-in-time of the data in a memory;
reading out the resending information from the memory;
comparing by a control unit the resending point-in-time included in the oldest resending information stored in the memory with current point-in-time;
executing resending processing of data according to a comparison result; and
modifying a number indicating a quantity of resending packets included in the resending information in accordance with an ACK signal.

8. The method of claim 7, wherein the memory is configured as a ring buffer, and wherein writing the resending information includes writing the resending information to a storage region of the memory according to a writing pointer indicating an address on said ring buffer.

9. The method of claim 7, wherein the resending information further includes resending packet size of the resending information.

10. The method of claim 7, wherein reading out the resending information includes reading out the resending information from a storage region of the memory according to a readout pointer indicating an address on the ring buffer.

11. The method of claim 10, further comprising:
determining whether or not the number indicating the quantity of the resending packets included in the resending information read out from the storage region of the address specified by the readout pointer is zero;
in the event of determining that the number indicating the quantity of the resending packets is zero, incrementing the address specified by the readout pointer without supplying the resending information to the control unit; and
in the event of determining that the number indicating the quantity of the resending packets is not zero, supplying the resending information to the control unit, and incrementing the address specified by the readout pointer.

* * * * *